United States Patent [19]

Sugishima

[11] Patent Number: 5,727,082

[45] Date of Patent: Mar. 10, 1998

[54] IMAGE READING, COPYING, TRANSMISSION, ETC., WITH TRANSLATION FROM ONE LANGUAGE TO ANOTHER

[75] Inventor: Kiyohisa Sugishima, Yokohama, Japan

[73] Assignee: Canon Kabushiki Kaisha, Tokyo, Japan

[21] Appl. No.: 420,083

[22] Filed: Apr. 11, 1995

[30] Foreign Application Priority Data

Apr. 20, 1994 [JP] Japan .................................. 6-082001
Mar. 9, 1995 [JP] Japan .................................. 7-049719

[51] Int. Cl.⁶ ............................................... H04N 1/32
[52] U.S. Cl. ........................... 382/229; 358/438; 358/440
[58] Field of Search ............................. 358/438, 400, 358/404, 406, 452, 453, 440, 442, 468; 364/275.9; 382/198, 229; 379/100; H04N 1/32

[56] References Cited

U.S. PATENT DOCUMENTS 5,021,889  6/1991  Yamamoto ........................... 358/440
5,077,804  12/1991  Richard .
5,535,120  7/1996  Chong et al. .

FOREIGN PATENT DOCUMENTS 564201  6/1993  European Pat. Off. .
5233696  9/1993  Japan ........................... G06F 15/38

*Primary Examiner*—Kim Vu
*Attorney, Agent, or Firm*—Fitzpatrick, Cella, Harper & Scinto

[57] ABSTRACT

The present invention is intended to cope with a case where a document image received through a communication line is written in a language of a different country in such a manner that translation is directly performed on the basis of received information, omitting intermediate processes in order to improve the translation efficiency and to prevent waste of recording paper. Therefore, if English image information has been facsimile-received, character recognition is performed on the basis of the received image. The translation is performed in accordance with a text consisting of recognized character data so that (for example) a Japanese text data is prepared. Then, a Japanese document image on the basis of the Japanese text data is produced, the Japanese document image being then output through a printer.

52 Claims, 7 Drawing Sheets

FIG. 5

| INPUT LANGUAGE | OUTPUT LANGUAGE |
|---|---|
| ENGLISH | JAPANESE |
| GERMAN | JAPANESE |
| FRENCH | JAPANESE |
| RUSSIAN | JAPANESE |
| JAPANESE | — |
| ⋮ | ⋮ |

IMAGE READING, COPYING, TRANSMISSION, ETC., WITH TRANSLATION FROM ONE LANGUAGE TO ANOTHER

BACKGROUND OF THE INVENTION

FIELD OF THE INVENTION

The present invention relates to an image processing apparatus and a control method therefor, and more particularly, to an image processing apparatus and a control method therefor of a type receiving image information through a communication line.

An apparatus of the foregoing type is exemplified by a facsimile apparatus. In a facsimile apparatus, a received image is usually printed immediately. Recently, a facsimile modem connected to a personal computer has enabled a document prepared on the personal computer to be transmitted as facsimile data.

Incidentally, character recognition technology has been improved significantly. Thanks to the improved character recognition technology, syntax analysis and the like, machine translation of a human language has been enabled.

In general, such translation is performed as follows. First, the image of an original document is read by means of an image scanner or the like; characters in the image are recognized; and syntax analysis and translation processes are performed. Therefore, translation of a facsimile-received English image or the like into Japanese by means of a character recognition apparatus has been enabled.

In a case where a product of printing is again read by an image scanner to translate the recognized characters, the quality of the image is, however, deteriorated as a result of the printing process and the reading process. Thus, there arises a problem in that character recognition and translation cannot accurately be performed. In particular, the operation for conveying the received and printed image to another apparatus to be read by the image reader, character-recognized and translated is a very complicated operation, and takes an excessively long time. In a case where the final purpose is to perform translation from one language to another, such as from English to Japanese, recording paper for use in the printing process is consumed wastefully.

Even with the highest character recognition and translation ratios achieved at present, character recognition and translation cannot be performed completely. Therefore, if machine translation is performed, there is a desire to be able easily and arbitrarily correct the result of the machine translation, on any other computer.

SUMMARY OF THE INVENTION

The present invention is intended to overcome the foregoing problems and an object of the present invention is to provide an image processing apparatus and a method of controlling the same that is capable of coping with a case where a document image received through a communication line is written in a language of a different country in such a manner that translation is directly performed on the basis of received information, omitting intermediate processes in order to improve the translation efficiency and to prevent waste of recording paper.

In order to achieve the foregoing object, an image processing apparatus according to the present invention has the following structure.

That is, an image processing apparatus for outputting a document image received through a communication line comprises: recognition means for recognizing a first language written in a received document image; translation means for translating to a second language on the basis of a result of the recognition performed by the recognition means; and image producing means for producing a document image written in the second language on the basis of a result of the translation performed by the translation means.

It is preferable that the image processing apparatus further comprises output means for forming the document image produced by the image producing means on a predetermined recording medium so as to output the document image. As a result, the result of translation of the received document image can be visualized at the time of output.

It is preferable that the image processing apparatus further comprises: network connection means for transmitting and receiving information to and from a network; storage means for storing information therein; first storing means for storing the received document image into the storage means as a file; second storing means for storing, into the storage means, a character code group of the first language recognized by the recognition means as a text file; third storing means for storing, into the storage means, a character code group of the second language translated by the translation means as a text file; and fourth storing means for storing, into the storage means, the document image produced by the image producing means as a file, wherein the files stored by the first to fourth storing means are shared by the various processing apparatuses connected to the network. Thus, the file obtained in each process can arbitrarily be supplied to any of the apparatuses on the network. Furthermore, if the file is a text file, editing can be performed.

In addition, reading means for reading the image of an original document and control means for sequentially subjecting the image of the original document read by the reading means to the processes to be performed by the recognition means, the translation means and the image producing means may be provided for the image processing apparatus. Therefore, the result of translation of an original document can be obtained by an operation similar to a usual copying operation.

Other and further objects, features and advantages of the invention will be appear more fully from the following description.

BRIEF DESCRIPTION OF THE DRAWINGS

FIG. 5 shows the contents of a table which permits the apparatus to process a received image written in any of a plurality of languages;

DESCRIPTION OF THE PREFERRED EMBODIMENTS

Figure 1:
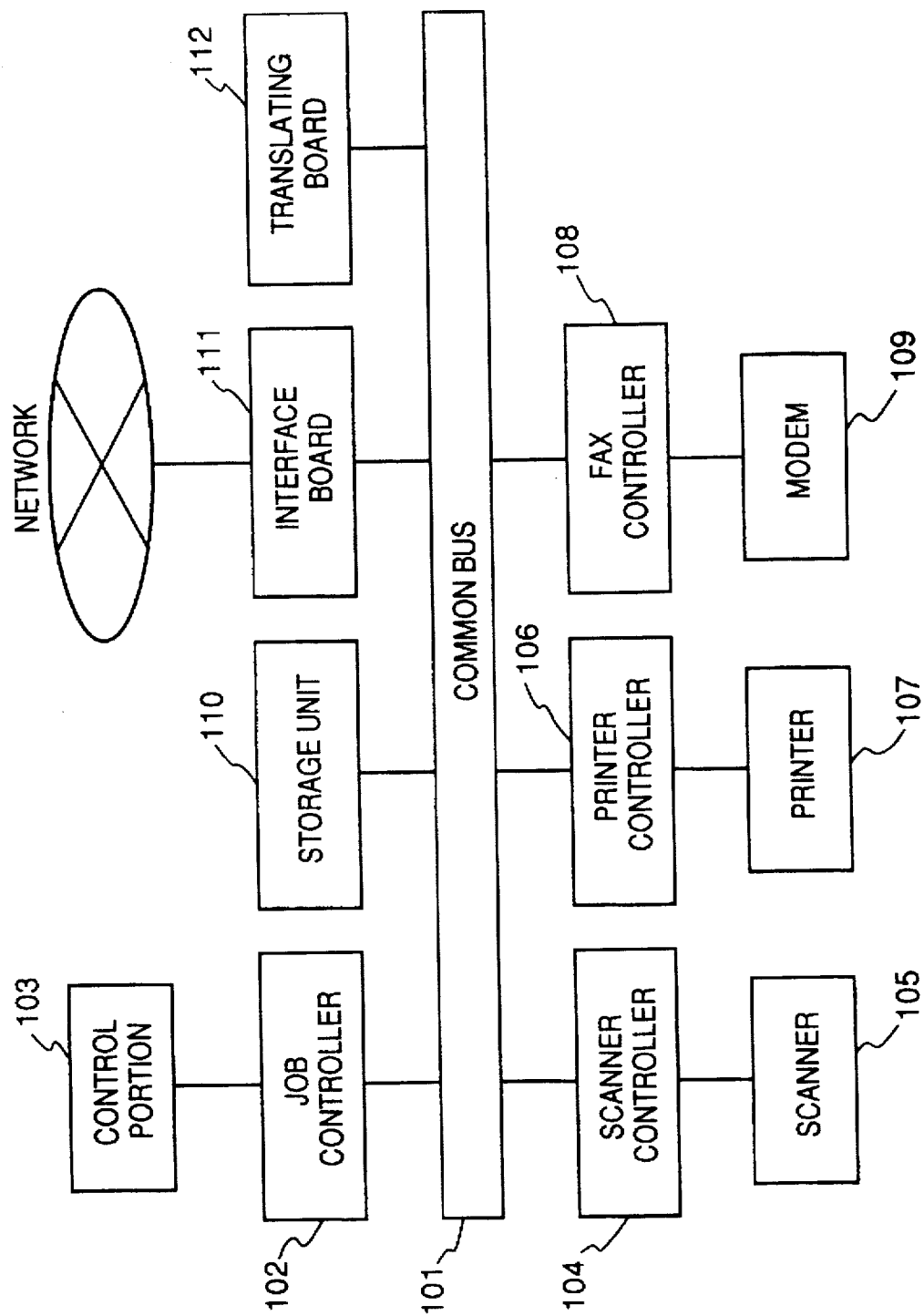
FIG. 1 is a block diagram of a copying machine according to an embodiment of the present invention that has a facsimile transmission/receipt function.

Referring to the drawings, the preferred embodiments of the present invention will now be described in detail.

FIG. 1 shows a block diagram of a copying apparatus according to an embodiment of the present invention.

The copying apparatus according to this embodiment has a function to serve as a facsimile apparatus, as will now be described. The copying apparatus comprises a communication means for transmitting, to devices (such as printers and computers) on a network, received images and for receiving image data from the computer or the like on the network to transmit the image data; and a large-capacity storage apparatus for storing received images (or images to be transmitted).

Referring to FIG. 1, reference numeral 101 represents a bus for electrically connecting a variety of component units to one another to transfer data and the like. Reference numeral 102 represents a job controller for controlling the apparatus overall, the job controller 102 comprising a CPU, a ROM, a RAM and so forth. Reference numeral 103 represents a control portion (for example, a keyboard) for inputting a variety of control instructions. Reference numeral 104 represents a scanner controller under control of the job controller 102 so as to control a scanner 105 for reading the image of a original document, the scanner controller 104 also performing a process for transferring read image data. Reference numeral 106 represents a printer controller for controlling the operation of a printer 107 and also transmitting image data to the printer 107 at predetermined timing. Reference numeral 108 represents a FAX controller for controlling a modem 109 that performs a facsimile transmission/receipt operation. Reference numeral 110 represents a large-capacity storage unit, such as a hard disk or an optomagnetic disk unit. The storage unit 110 stores an OS (an Operating System) of the apparatus according to the present invention and a processing program to be described below. Furthermore, the storage unit 110 stores images read by the scanner 105, images to be facsimile-received or transmitted, and a spool file to be transmitted to the printer 107. Reference numeral 111 represents an interface board for connecting the apparatus to a network to transmit and/or receive data so as to transmit image data stored in the storage unit 110 to a computer on the network in accordance with an instruction from the computer, the interface board 111 further transmitting the image data to another printer on the network. As a matter of course, the interface board 111 receives image data from the network. If image data has been received from any device on the network, the interface board 111 is able to temporarily store the received image data in the storage unit 110 so as to print the data by means of the printer 107 in accordance with an instruction or to facsimile-transmit the same. Reference numeral 112 represents a translating board for recognizing (intermediately preparing a recognized-character-code file) characters of a document image written in, for example, English, translating it into, for example, Japanese, and creating a Japanese document image on the basis of a result of the translation. As a matter of course, the source language is not limited to English, and the present invention may be applied to a translation process from, e.g., Japanese to English or another language. The necessity is that the apparatus according to the present invention has a translating function from a certain language to another language and an image producing and processing function on the basis of the result of the translation.

A portion of the operation of the copying apparatus having the foregoing structure and according to this embodiment will now be described with reference to a flow chart shown in FIG. 2. The program based on of the flow chart is stored in the storage unit 110. After electric power has been supplied to the apparatus, the job controller 102 loads the OS and the foregoing program into the RAM thereof in accordance with a boot program stored in the ROM thereof so that the program is executed. In order to simplify the description, an example will be described in this embodiment in which an English image received is character-recognized and translated.

In step S201, a discrimination is made as to whether or not the printer and scanner for performing copying and facsimile operation are being operated. If they are not being operated, units connected to the apparatus according to this embodiment are identified. As mentioned, the apparatus according to this embodiment comprises the common bus 101 to which boards can be detachably mounted, and via which a connection with an external unit is established and the facsimile function and the like are realized.

In step S203, a discrimination is made as to whether or not a copying demand has been issued from the control portion 103 (whether or not a copying key has been depressed). If a copying demand has been issued, the operation proceeds to step S211, in which a discrimination is made as to whether or not a translation switch has been switched on through the control portion 103. If the translation switch has been switched off, the operation proceeds to step S214, in which scanning and printing demands are issued to the scanner controller 104 and the printer controller 106 so that the usual copying process is performed.

If the translation switch has been switched on, the operation proceeds from step S211 to step S215, in which a scanning demand is issued to the scanner controller 104. Then, the operation proceeds to step S216, in which the read image data is, as a file, stored in the storage unit 110. After processes for reading and storing a sequence of original document images have been completed, the operation proceeds to step S217, in which a demand of translation is issued to the translating board 112. In accordance with the issued demand, the translating board 112 performs a translation process on the basis of the file (the image file) stored in step S216, so that a Japanese document image file is stored in the storage unit 110.

Figure 3:
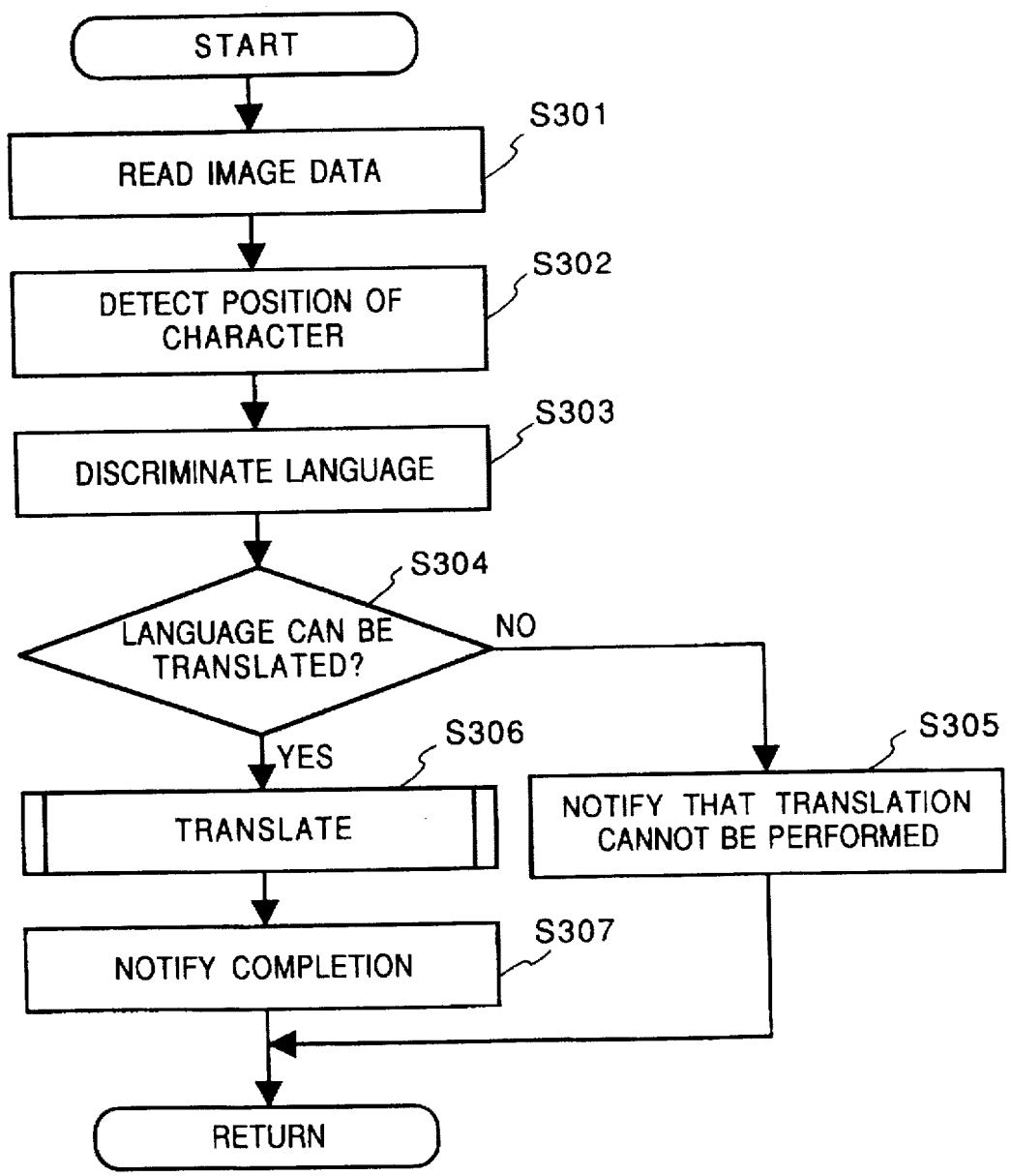
FIG. 3 is a flow chart showing the contents of processes to be performed when a demand to perform translation is issued during the process in the flow chart shown in FIG. 2.

The foregoing process is performed in accordance with the flow chart shown in FIG. 3. Initially, image data is, in units of pages, read from the image file which has been stored in step S216, onto the RAM disposed in the job controller 102 (step S301) so as to detect the position of each character. Then, only a predetermined quantity of characters are cut, so as to recognize the characters so that the language of which the sentence is composed maybe discriminated (step S303). In accordance with the result of the discrimination, a discrimination is made as to whether or not the subject document image can be translated. Since this embodiment is arranged to translate an English image, other languages, for example, French and Russian, are not subjects for translation, and therefore a discrimination is made that translation of the latter languages cannot be performed. The discrimination of the language is performed in accordance with dictionaries for the respective languages stored in advance in the storage unit 110 in such a manner that the dictionary including a word which has been identified in the character recognition, is detected, and the presence of characters peculiar to each respective language is discriminated. If necessary, this procedure is repeated with an increased quantity of characters, until the language can be discriminated. That is, if a word common to plural languages is identified, the process is continued until one language can be discriminated. Since this embodiment is arranged to translate from English, an English character recognizing dictionary may be used to discriminate that the document cannot be translated if the input document is not an English document.

If a discrimination has been made that translation cannot be performed, the operation for translating the read image data is interrupted, and the fact that translation cannot be performed is communicated to an upper-level routine that has called the foregoing process (step S305). Thus, the process is ended here.

If a discrimination has been made that translation can be performed, the operation proceeds to step S306. In step S306, the image data is translated, and the resulting Japanese image data is finally stored in the storage unit 110. Then, the operation proceeds to step S307, where the fact that the translation has been completed normally is reported to the upper routine, and the operation is ended here.

Figure 2:
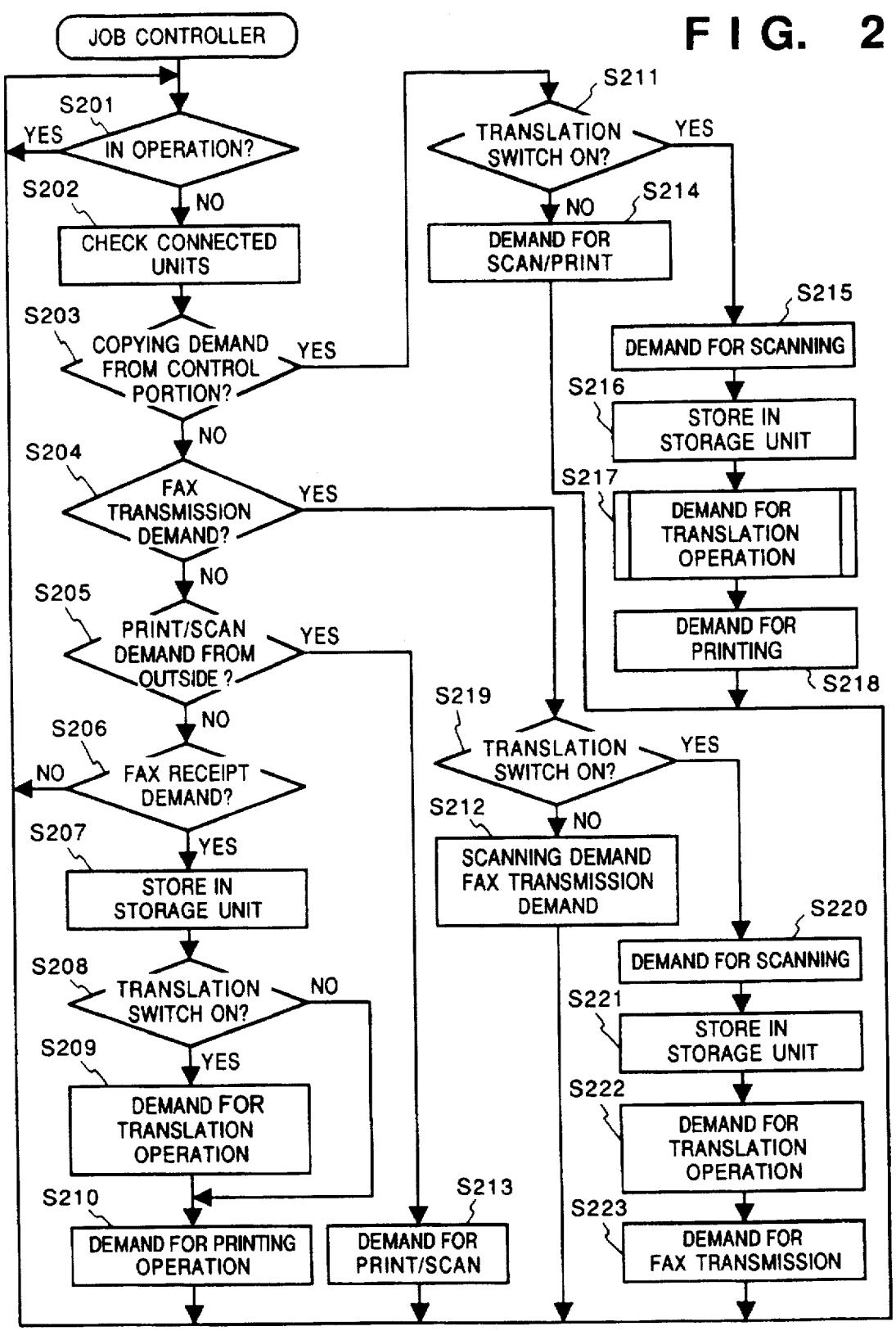
FIG. 2 is a flow chart showing the contents of processes of the copying machine according to the embodiment of FIG. 1.

After translation has been completed, the operation proceeds to step S218 shown in FIG. 2 so that a printing command is issued to the printer controller 106. Thus, the prepared Japanese image data is output in a predetermined procedure so that the Japanese image is formed on recording paper, the recording paper then being output. If the translation cannot be completed normally, the original image data is printed out as (more exactly, in lieu of the result of the translation.

If a discrimination has been performed that a demand for transmitting facsimile data has been issued (step S204), the operation proceeds to step S219 to discriminate whether or not the translation switch has been switched on. If the translation switch has been switched off, the operation proceeds to step S212 so that a demand is issued to the scanner controller 104 to read the original document while a demand is issued to the FAX controller 108 to transmit information about the read original document. If a demand has been issued from a computer on the network to transmit facsimile data, the telephone number of the station to which the data is to be transmitted and image data to be transmitted, are stored in the storage unit 110. Then, the station is called and the image data is transmitted. If a transmission demand, which includes information for appointing a specific image file in the storage unit 110 and information of the telephone number of the station to which data is to be transmitted, has been issued from the network, the corresponding image file in the storage unit 110 is transmitted to the connected station. If the translation switch has been switched on in step S219, scanning (reading) is performed similarly to the copying operation, the translation process is performed, and the result of the translation is transmitted. In this case, a Japanese document is translated into English and transmitted.

If a command for printing or scanning has been made from a computer or the like on the network through the interface board 111 in step S205, the operation proceeds to step S213. If the demand is a printing demand, image data transmitted next is temporarily stored in the storage unit 110. Then, a demand to print the image data is issued to the printer controller 106, followed by performing a predetermined process so that the received image data is printed. The reason why the image data is temporarily stored in the storage unit 110 is that the transfer speed on the network is different from the communication speed realized by the modem 109 or the transfer speed to the printer 107. If a scanning demand has been made, a scanning demand is issued to the scanner controller 104 so that the original document image is read. The read original document image (including a case where the original document consists of a plurality of sheets) is temporarily stored in the storage unit 110 and then transmitted to the computer or the like, which has issued the demand, through the interface board 111.

In step S206, a discrimination is made as to whether or not a FAX receipt demand has been received (whether or not a call has been received) through the modem 109 and the FAX controller 108. If a receipt demand has been issued, the operation proceeds to step S207 so that received image data is stored in the storage unit 110. Then, the operation proceeds to step S208, and a discrimination is made as to whether or not the translation switch has been switched on is discriminated. If the translation switch has been switched on, the operation proceeds to step S209, in which the translation process is performed. Since this translation process is the same as that to be performed in step S217 (in accordance with the flow chart shown in FIG. 3), its description is omitted here. If the translation switch has been switched off in step S208 or if the translation process has not been performed normally, the operation proceeds to step S210. In this case, the received image data is printed out.

Figure 4:
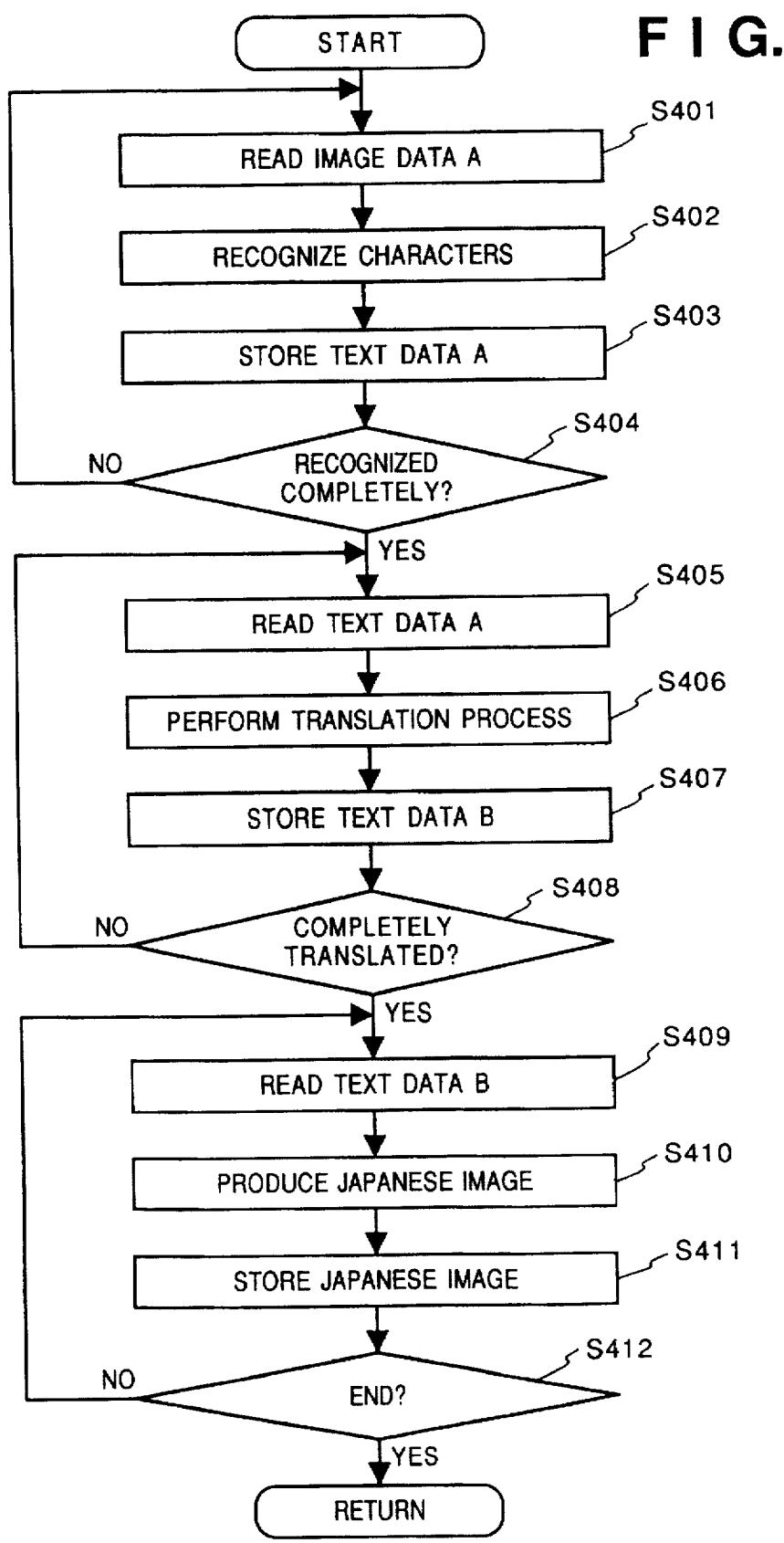
FIG. 4 is a flow chart showing specific contents of the translation process shown in FIG. 3.

The specific contents of the translation process to be performed in step S306 shown in FIG. 3 will now be described with reference to the flow chart shown in FIG. 4.

Initially, in step S401, and page of image data to be translated is read from the storage unit 110. In step S402, a character recognition process is performed on the read image data. The character recognition process is usually performed in such a manner that the position and range in which the character is cut, are specified, and a cutting process is performed in preparation for character recognition. Also, this embodiment employs the foregoing procedure.

When the character recognition has been completed, character codes (ASCII), which are the results of the recognition processing, can be obtained sequentially. Therefore, the character codes are, as files, stored in the storage unit 110 (step S403). Then, the foregoing process is repeated until a discrimination is made in step S404 that the character recognition process for all images has been completed. As a result, an original image file and a text file obtained due to the recognition are prepared in the storage unit 110.

After the character recognition process has been completed, the operation proceeds to step S405 so that the text data prepared by means of the foregoing process is read in predetermined units (e.g., in sentence units)(step S405) so as to be translated into Japanese (step S406). Thus, a Japanese text code (for example, a JIS code) is prepared which is then sequentially stored in the storage unit 110. The foregoing process is repeated until a discrimination is made that the process is completed (step S408).

Then, the operation proceeds to step S409 in which the character codes are sequentially read from the prepared Japanese text file. Furthermore, character patterns corresponding to the character codes are prepared so as to produce a Japanese image (step S410). Since image data to be translated may contain image information as well as character information, synthesis with the image information is performed so that image data, in which only sentences are translated into Japanese, is produced. In this embodiment, the units to be produced are Japanese image data in page units. The produced Japanese image data is stored in the storage unit 110 as an image file (step S411). The foregoing process is repeated until a discrimination is performed that all the Japanese texts have been processed. When the Japanese image data has been prepared, the process is ended.

There are stored in advance, in the storage unit 110, the dictionaries to which reference is made in the course of character recognition and dictionaries with which syntax analysis and conversion to Japanese are performed.

The reason why all pages of the English images (a good possibility exists that a plurality of pages might exist) are stored and then the character recognition is performed, is that the ensuing translation process can then be performed smoothly. There is a good possibility that a given sentence in the English image might be written over two pages, for example. Therefore, if character recognition and translation are performed in page units, the last sentence of the page is left incomplete and the English image on the next page must be read. This leads to increased overhead of the process, and a work memory having a sufficient capacity must be used. However, if the memory capacity is sufficiently large and the job controller 102 can be operated at satisfactorily high speed, the foregoing case does not give rise to a problem.

When the instruction to copy the English image and the facsimile receipt of the English image have been performed as a result of the foregoing process, the original English image data file, the English text file after the character recognition, the Japanese text file after the translation and a Japanese image data file prepared on the basis of the Japanese text file are, as a result, prepared in the storage unit 110. Thus, a user on the network is enabled to cause the four files to be arbitrarily supplied (the name of the file and a command to instruct the transference are transmitted) to display the file on the user's own computer. Furthermore, the user is able to edit a text file if the user has received the text file. As a result, an effect can be obtained that even if the translation process has been performed incompletely, a human being is able to easily modify the result.

As a result of the translation processes, the four files are stored in the storage unit 110. In this case, it is preferable that the names of the files be unified and identification of the types of the files be performed easily. In an example case where a user of a certain computer on the network intends to display, on the display screen of the computer, the original image and a translated Japanese image, the user is required to issue, to the apparatus according to this embodiment, a command to require transfer of a file list in the storage unit 110. In the foregoing case, it is inconvenient if the correspondence among the files cannot be recognized.

For example, the time the image was read by the image scanner or was facsimile-received can be used as the name of the file. If the receipt year is 1994, the date is Apr. 12 and the time is 14:05, the name of the file would be "9404121405". Since a plurality of the apparatuses according to this embodiment are connected to the network and each apparatus is connected to the communication line, images which have been facsimile-received at the same time are given the same file name to be stored. If confusion occurs when a user of the network instructs the apparatus according to this embodiment to transfer the received image, a peculiar ID unique to each apparatus on the network may be included as a portion of the file name.

Since the file name as described thus far does not permit recognition that the subject data is a text file obtained by character recognition or a text file after translation or Japanese image data, corresponding character strings in the form of an expander are added to provide this information.

The foregoing process causes the files to be sequentially stored in the storage unit 110 when the translation switch has been switched on. Therefore, it is preferable that the storage unit 110 be a large-capacity unit, such as an optomagnetic disk. However, enlargement of the file quantity cannot be prevented. To overcome this problem, the user on the network is required to transfer, to the apparatus, the file name intended to be deleted and a command of the deletion so that the intended file is deleted.

As for files administrated by means of the date and therefore having no special storage instruction (as well as files that have not been indicated as important files), deletion may be performed in the order of the date of storage.

As described above, according to the present invention, an English image received from the outside of the network is temporarily printed without being again read and translated. Therefore, operation efficiency can be improved and deterioration in the quality of the printed and read image can be prevented. Thus, excellent character recognition can be realized and a satisfactory translation result can be obtained. Since the English text files and the Japanese text files prepared intermediately are positively stored in the storage unit 110, the user on the network is able arbitrarily to read the original image, translated image and their text files. If the read data is a text file, the user is able to arbitrarily edit the text file.

Although the character recognition is, in the foregoing embodiment, performed after the receipt of all facsimile images has been completed, the character recognition process may be performed on the basis of an image obtained directly from the decoding of information which has been facsimile-received.

In place of the translating board, translation software in a computer connected through the interface board may be used to perform translation followed by printing out.

The printer controller may have a translation function so that data is printed out while being sequentially translated.

Although the language is discriminated in this embodiment such that one clause is detected and then the sentence including the clause is discriminated, a structure in which a language switch is provided in the control portion and the translation is performed in accordance with the instruction from the switch, can omit the language discrimination portion. When a copying operation is performed, the language of the original document has been detected and, therefore, the language detection process can be omitted.

Although this embodiment has a structure according to which the translation is performed when data is facsimile-received, the same structure is able to perform the translation at the time of data transmission, and then to transmit the result of the translation.

Although the present invention has been described with regard to facsimile receipt images, image information transmitted to or received from a computer or the like through the interface board can be translated by means of the structure according to this embodiment.

In this embodiment, while the one of the operations is being performed, the other operations are not performed. However, an operation using no memory can be performed easily during use of the memory by changing the control software for the job controller. For example, a copying operation using the scanner and the printer can be performed during the translation operation.

Although this embodiment has been described with regard to the example in which a Japanese image is prepared from an English image, a contrary operation can, of course, be performed. The present invention is not limited to any particular choice of languages. The necessity lies in that translation between two languages can be performed.

Although the apparatus according to this embodiment is an apparatus for use primarily in the part of the world where the target language is spoken (Japan, in the case of Japanese) one apparatus can be used throughout the world by enabling, for example, the contents of the translation to be selected.

By previously setting and registering in the storage unit 110, for example, a table for making an output language correspond to an input language, an image obtained by translating a received language image can be output regardless of the language received. If the apparatus according to the present invention is used in an English speaking country, all outputs are written in English as a matter of normal course in a case where translation between languages can be performed. In the foregoing case, the output language is set in advance and the input language is appointed by a selection operation performed by the operator, or the input language is discriminated in step S303 shown in FIG. 3 so that required dictionaries are accessed from the table shown in FIG. 5 so as to perform the translation process.

Although facsimile images have been described in the foregoing embodiment, documents (aggregate information of character codes) may, of course, be processed. Since information is usually transmitted or received through facsimile communication, an advantage can be realized when the structure according to the present invention is applied to a facsimile apparatus at the time of constituting a network in terms of the frequency of use.

Although the received image is translated and the read image is translated in this embodiment when the translation switch of the control portion 103 is switched on, a structure may be employed in which, for example, a language contained in the received image is discriminated and the translation process is automatically started on the basis of the result of the discrimination.

Second Embodiment

Although the foregoing embodiment has the structure in which the translation process is performed automatically, the process can be initiated manually by an operator. By previously setting character recognition dictionaries, the recognition can accurately be performed at high speed.

Figure 6:
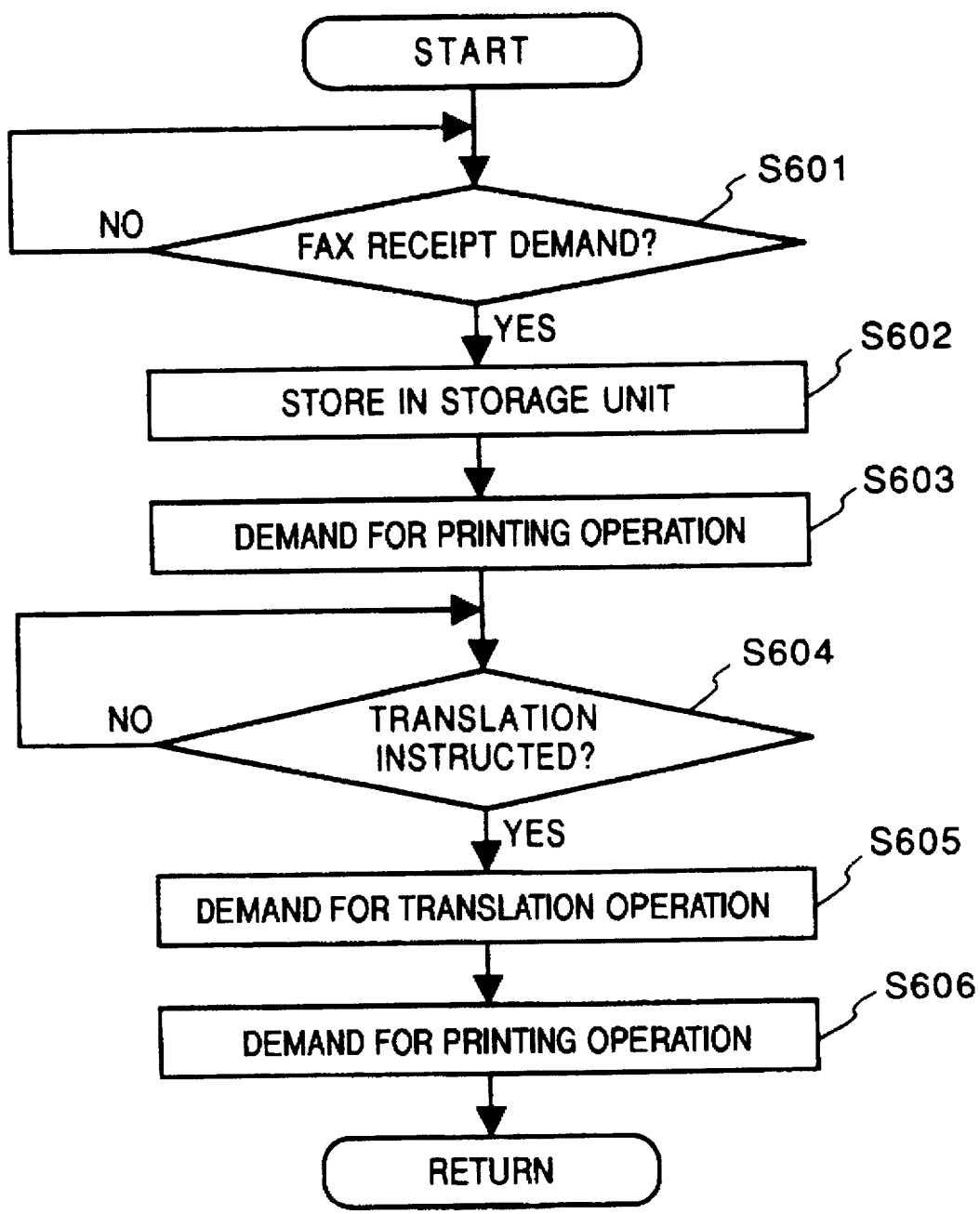
FIG. 6 is a flow chart showing the contents of a facsimile-receipt process according to a second embodiment of the present invention.

FIG. 6 is a flow chart showing the process to be performed in the foregoing case. The description will be made about only the portions relating to the facsimile receipt. The other process portions and structures are the same as those of the foregoing embodiment and, therefore, they are omitted from description.

Initially, in step S601, a discrimination is made as to whether or not a facsimile receipt demand (a call) has been received through the modem 109 and the FAX controller 108. If the receipt demand has been received, the operation proceeds to step S602, in which received image data is stored in the storage unit 110. In step S603, the received image data is printed out. In this case, all received data is not required to be printed out. For example, setting is made such that data for the leading one or two pages is output so as to enable the operator to recognize the language in which the received image data has been written. Note that image data to be output may be a portion of one page, in place of outputting image data for an entire page. At this time, the following messages are printed simultaneously with the foregoing image data: a predetermined message, for example, indicating the fact that the printed data is a sample output and that only a portion of the received data is printed; and a message for urging an instruction to be issued as to which language the image data should be output.

In step S604, a discrimination is made as to whether or not the instruction to perform the translation has been issued from the operator through the control portion. Since the operator has recognized the language in which the image data has been written, in accordance with the image data output in step S603, the operator inputs an instruction identifying that language and the language to be output through the control portion 103. Note that the output language may be fixed, in which case only the language in which the received document is written may be chosen by the operator.

In step S605, a demand is issued to the translating board 112 to perform translation. If a German document has been received in step S601 and translation from German to Japanese has been instructed in step S605, the translating board 112 performs the translation process at the instructed demand and on the basis of the file (the image file) stored in step S602, and stores a Japanese document image file in the storage unit 110. The foregoing process is performed in accordance with the flow charts shown in FIGS. 3 and 4. Since the flow charts have been described above, their description is omitted here.

After the translation process has been completed, the operation proceeds to step S606, and a printing demand is issued to the printer controller 106 so that the prepared Japanese image data is output in a predetermined procedure. Thus, the Japanese image is formed on the recording paper so as to be output. If the translation has not been performed normally, the original image data is printed out as it is as (or rather, in lieu of) the result of the translation.

As described above, according to the second embodiment, although paper for one page is consumed, the structure in which the dictionaries to be used for the character recognition are determined by the selection operation performed by the operator, enables the character recognition to be easily and accurately performed. Furthermore, it is easy in this manner to cope with a plurality of languages.

In the foregoing process, the four files, that is, the received image, the result of the character recognition, the result of the translation and the output image, are stored in the storage unit, similarly to the first embodiment. Furthermore, the four files are used in the same manner as that according to the first embodiment.

Third Embodiment

A third embodiment of the present invention will now be described, in which the dictionaries for the character recognition are automatically selected, in place of the manual selection by an operator.

In this embodiment, dictionaries determined by any of the following three methods are set.

A first method has the steps of: inputting, through the control portion or the like, a code with which the transmission-side operator is able to identify the language of the document to be transmitted; causing the code to be included in an NSS signal in a procedure signal for use in the facsimile communication and transmitting the NSS signal (bytes following the fourth byte of the FIF of the NSS signal are left free for use by the manufacturer, that is, the same is permitted to be used freely); and setting dictionaries corresponding to the identification code if the receiving side has received the identification code.

A second method has the steps of: discriminating the country from which the document to be received by the receiving side has been transmitted; storing the relationship between the result of the discrimination and the translating dictionaries as a table; and performing translation on the basis of the table. At this time, the transmission-side country is identified in accordance with the TSI signal in the receiving procedure signal. The receiving side has the domestic telephone number registered therein so as to subject the received telephone number in the ascending order. Since stations sometimes transmit the international telephone number, figures over the number of digits of the registered number are ignored.

A third method uses a structure that the transmission side adds an identifier indicating the language of the document to be transmitted to a predetermined position of data to be transmitted (a document to be transmitted) and transmits the data; and the receiving side identifies the language in accordance with the identifier to select dictionaries for the translation. The identifier is formed into a mark sheet or a bar code so as to be easily identified by the receiving side.

Assuming that the setting is made such that received document is translated into Japanese and receipt of a German document has been identified by any of the foregoing three methods, a German dictionary, is set as the character recognition dictionary, and a dictionary for translating German to Japanese is selected.

Figure 7:
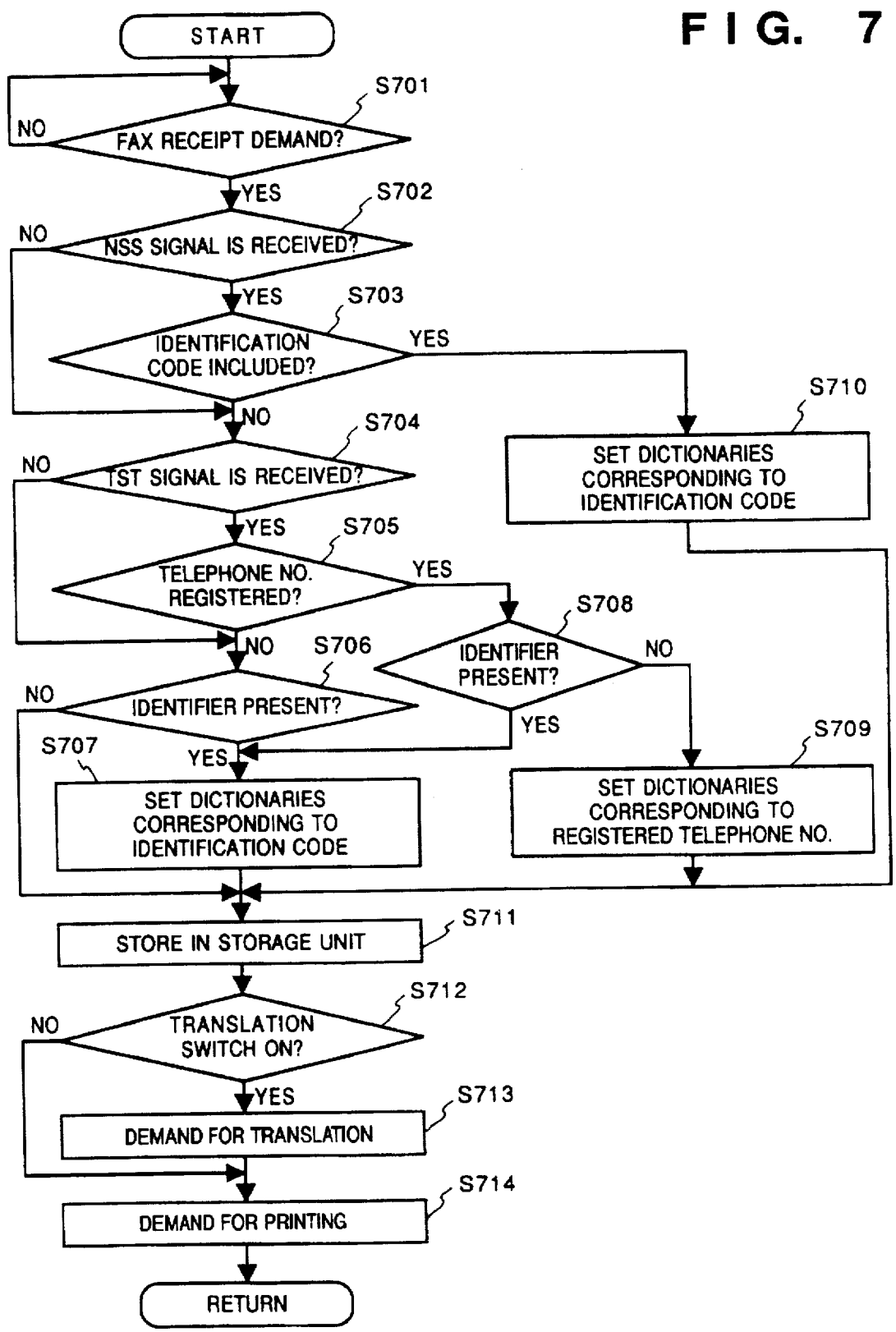
FIG. 7 is a flow chart showing the contents of a facsimile-receipt process according to a third embodiment of the present invention.

The flow of the foregoing process will now be described with reference to a flow chart shown in FIG. 7. The description will now be made about only the portions relating to the facsimile receiving operation. Since the other processes and the structure of the apparatus are the same as those according to the first embodiment, they are omitted from the description.

Initially, in step S701, a discrimination is made as to whether or not a demand to receive a facsimile data has been supplied from outside through the modem 109 and the FAX controller 108 (i.e., whether or not a call has been received). If the receiving demand has been supplied, a previous procedure for the facsimile communication is started. In step S702, a discrimination is made as to whether or not an NSS signal has been received. If the NSS signal has been received, the operation proceeds to step S703. If the NSS signal has not been received, the operation proceeds to step S704.

In step S703, a discrimination is made as to whether or not bytes following the fourth byte of the FIF of the received NSS signal include an identification code indicating the language of the document. If the identification code is included, the operation proceeds to step S710, in which dictionaries for character recognition corresponding to the identification code are set. If the identification code is not included, a discrimination is made in step S704 as to whether or not a TSI signal has been received. If the TSI signal has been received, the operation proceeds to step S705. If the TSI signal has not been received, the operation proceeds to step S706.

In step S705, a discrimination is made as to whether or not the telephone number of the transmission side included in the received TSI signal coincides with the telephone number registered while being made correspond to the dictionary to be set. If the telephone number has been registered, this number is temporarily stored and the operation proceeds to step S708. In step S708, a discrimination is made as to whether or not an identifier indicating the language of the document is present at a predetermined position of the received document data. If the identifier is not present, a character recognition dictionary corresponding to the telephone number identified in step S705 is set.

If the TSI signal has not been received in step S704 or if the telephone number received in step S705 has not been registered, a discrimination is made in step S706 as to whether or not an identifier indicating the language of the document is present at a predetermined position of the received document data. If the identifier is present in steps S706 and S708, a character recognition dictionary corresponding to the identifier is set.

The reason why the identifier in step S708 is given priority over the telephone number registered in step S705 is to deal with the following example case, in which the registered telephone number is present in France (for example) but the same transmits English document data.

If no identifier is present in step S706, characters are recognized from all dictionaries, as is done in step S303.

In step S711, received image data is stored in the storage unit 110. Then, the operation proceeds to step S712 in which a discrimination is made as to whether or not the translation switch has been switched on. If the translation switch has been switched on, the operation proceeds to step S713, in which the translation process is performed. The translation process is performed in accordance with the flow charts shown in FIGS. 3 and 4 in the same manner as that according to the foregoing embodiment. Therefore, the description of the translation process is omitted here. However, the discrimination in step S303 is performed in such a manner that the language determined in steps S707, S709 and S710 is used except in a case where a negative discrimination is made in step S706.

When the translation operation has been completed, the operation proceeds to step S714 in which the result of the translation is printed out. If the translation switch has been switched off in step S712 or if the translation process has been performed incompletely, the operation also proceeds to step S714, in which the received image data is printed out.

If an identifier is added to each of the pages of the document, a case in which the document consists of pages in each of which data is written in different languages, can be dealt with also.

Also, the third embodiment has the same structure as that of the first embodiment in terms of an arrangement in which the text file, which is the result of the character recognition, and the text file, which is the result of the translation, are respectively stored in the storage unit.

According to the foregoing third embodiment, dealing with received data in a plurality of languages can easily be achieved. Since the dictionaries for the character recognition are also set in accordance with the procedure signal and the identifier in the received data, no operator intervenes, and erroneous setting can be prevented. Thus, recognition can be performed accurately.

In the foregoing process, the four files, that is, the received image, the result of the character recognition, the result of the translation and the output image are stored in the storage unit, similarly to the first embodiment. Furthermore, the four files are used in the same manner as that according to the first embodiment.

The present invention is also effective in a system consisting of a plurality of apparatuses and ;n a system consisting of one apparatus. Furthermore, the present invention may, of course, be realized by supplying a program from outside.

As described above, according to the present invention, in a case where a document image received through a communication line is written in languages of different countries, translation is directly performed on the basis of the received information so that intermediate operations are omitted. Thus, the efficiency of the translation can be improved.

Although the invention has been described in its preferred form with a certain degree of particularity, it is to be understood that the present disclosure of the preferred form can be changed in the details of construction, and that combination and rearrangement of parts may be resorted to without departing from the spirit and the scope of the invention as hereinafter claimed.

What is claimed is:

1. An image processing apparatus for outputting a document image received through a communication line, comprising:

receiving means for receiving information including document image data and a language indicating code that indicates a language of the document image;

first extraction means for extracting the received language indicating code:

second extraction means for extracting a partial image of a received document image positioned at a predetermined position in the document image;

third extraction means for extracting information of transmission-side line number which is supplied and received during a negotiation at the time of a call receipt;

appointing means arranged in such a manner that if any of extraction performed by said first to third extraction means has been performed normally, then said appointing means appoints dictionaries for character recognition on the basis of a result of the extraction;

recognition means for recognizing characters in the received document image by using the dictionaries for character recognition appointed by said appointing means;

translation means for translating to a predetermined language on the basis of a result of the recognition performed by said recognition means; and image producing means for producing a document image on the basis of a result of the translation performed by said translation means.

2. An image processing apparatus according to claim 1, wherein said appointing means appoints the dictionaries for the character recognition in accordance with the priority order as said first extraction means, said second extraction means and said third extraction means.

3. An image processing apparatus according to claim 1, wherein said first extraction means extracts a language indicating code contained in an NSS signal, and said second extraction means extracts a bar-code image at a predetermined position in the document image.

4. An image processing apparatus according to claim 1 further comprising second appointing means for appointing a language to which the translation is performed by said translation means.

5. An image processing apparatus according to claim 1 further comprising output means for forming the document image produced by said image producing means on a predetermined storage means so as to output the document image.

6. An image processing apparatus according to claim 1 further comprising:

network connection means for transmitting information to and receiving information from a network;

storage means for storing information therein;

first storing means for storing, into said storage means, a character code group recognized by said recognition means as a text file;

second storing means for storing, into said storage means, a character code group recognized by said recognition means as a text file;

third storing means for storing, into said storage means, a character code group translated by said translation means as a text file; and fourth storing means for storing, into said storage means, the document image produced by said image producing means as file, wherein the files stored by said first to fourth storing means are shared by the plural processing apparatuses connected to said network.

7. An image processing apparatus according to claim 1 further comprising:

reading means for reading the image of an original document; and control means for sequentially subjecting the image of the original document read by said reading means to the processes to be performed by said recognition means, said translation means and said image producing means.

8. A method of controlling an image processing apparatus for outputting a document image received through a communication line, comprising:

a receiving step for receiving information including document image data and a language indicating code that indicates a language of the document image;

a first extraction step for extracting the received language indicating code;

a second extraction step for extracting a partial image at a predetermined position in the received document image;

a third extraction step for extracting information of transmission-side line number which is supplied and received during a negotiation at the time of a call receipt;

an appointing step in which if any of extraction operations performed in said first to third extraction steps has been performed normally, then dictionaries for character recognition are appointed on the basis of a result of the extraction;

a recognition step for recognizing characters in the received document image by using the dictionaries for character recognition appointed in said appointing step;

a translation step for translating to a predetermined language on the basis of a result of the recognition performed in said recognition step; and an image producing step for producing a document image on the basis of a result of the translation performed in said translation step.

9. A method of controlling an image processing apparatus according to claim 8, wherein, in said appointing step the dictionaries for the character recognition are appointed in accordance with the priority order as said first extraction means, said second extraction means and said third extraction means.

10. A method of controlling an image processing apparatus according to claim 8, wherein in said first extraction step a language indicating code contained in an NSS signal is extracted, and in said second extraction step a bar-code image at a predetermined position in the document image is extracted.

11. A method of controlling an image processing apparatus according to claim 8 further comprising a second appointing step for appointing a language to which the translation is performed in said translation step.

12. A method of controlling an image processing apparatus according to claim 8 further comprising an output step for forming the document image produced in said image producing step on a predetermined recording medium so as to output the document image.

13. A method of controlling an image processing apparatus according to claim 8 further comprising:
   a step for transmitting and receiving information to and from a variety of processing apparatuses on a network;
   a first storing step for storing the received document image into a predetermined storage means as a file;
   a second storing step for storing, into said storage means, a character code group recognized in said recognition step as a text file;
   a third storing step for storing, into said storage means, a character code group translated in said translation step as a text file; and
   a fourth storing step for storing, into said storage means, the document image produced in said image producing step as a text file, wherein
   the files stored in said first to fourth steps are shared by the variety of processing apparatuses connected to said network.

14. A method of controlling an image processing apparatus according to claim 8 further comprising:
   a reading step for reading the image of an original document; and
   a control step for sequentially subjecting the image of the original document read in said reading step to the processes to be performed in said recognition step, said translation step and said image producing step.

15. A data processing apparatus comprising:
   receiving means for receiving, though a communication line, document information and a language indicating code that indicating the language of the document information;
   discrimination means for discriminating the language of the document information received by said receiving means based on the language indicating code;
   selecting means for selecting a dictionary from a plurality of dictionaries for translating the language of the document information based on a result obtained by said discrimination means;
   translation means for translating the language of the document information received by said receiving means to a predetermined language by using the dictionary selected by said selecting means; and
   outputting means for outputting document information indicating the result of a translation performed by said translation means.

16. A data processing apparatus according to claim 15, further comprising:
   first storing means for storing document information received by said receiving means; and
   second storing means for storing document information indicating the result of a translation performed by said translation means.

17. A method of controlling a data processing apparatus comprising:
   an inputting step of inputting document information and a language indicating code indicating the language of the document information, received through a communication line;
   a discrimination step of discriminating the language of the document information inputted in said inputting step based on the language indicating code;
   a selecting step of selecting a dictionary from a plurality of dictionaries for translating the language of the document information inputted in said inputting step;
   a translation step of translating the language of the document information inputted in said inputting step to a predetermined language by using the dictionary selected at said selecting step; and
   an outputting step of outputting document information indicating a result of the translation performed in said translation step.

18. A storage medium form which code data is read into a memory of a data processing apparatus, said storage medium comprising:
   a procedure code for an inputting step of inputting document information and a language indicating code indicating the language of the document information, received through a communication line;
   a procedure code for a discrimination step of discriminating the language of the document information inputted in said inputting step based on the language indicating code;
   a procedure code for a selecting step of selecting a dictionary from a plurality of dictionaries for translating the language of the document information inputted in said inputting step;
   a procedure code for a translation step of translating the language of the document information inputted in said inputting step to a predetermined language by using the dictionary selected in said selecting step; and
   a procedure code for an outputting step of outputting document information indicating a result of the translation performed in said translation step.

19. An image processing apparatus for outputting a document image received through a communication line, comprising:
   receiving means for receiving, through the communication line, information including document image data and a language indicating code that indicates a language of the document image;
   extracting means for extracting the received language indicating code;
   discrimination means for discriminating the language of a document image to be received on the basis of a result of the extraction performed by said extraction means;
   selecting means for selecting at least one dictionary from a plurality of dictionaries for character recognition on the basis of a result of the discrimination performed by said discrimination means;
   recognition means for recognizing characters in the received document image by using the dictionary for the character recognition selected by said selecting means;
   translation means for translating to a predetermined language on the basis of the recognition performed by said recognition means; and
   image producing means for producing a document image on the basis of a result of the translation performed by said translation means.

20. An image processing apparatus according to claim 19 further comprising appointing means for appointing a language to which the translation is performed by said translation means.

21. An image processing apparatus according to claim 19 further comprising output means for forming the document image produced by said image producing means on a predetermined recording medium so as to output the document image.

22. An image processing apparatus according to claim 19 further comprising:

network connection means for transmitting information to and receiving information from a network;

storage means for storing information therein;

first storing means for storing the received document image into said storage means as a file;

second storing means for storing, into said storage means, a character code group recognized by said recognition means as a text file;

third storing means for storing, into said storage means, a character code group translated by said translation means as a text file; and fourth storing means for storing, into said storage means, the document image produced by said image producing means as a file, wherein the files stored by said first to fourth storing means are shared by the various processing apparatuses connected to said network.

23. An image processing apparatus according to claim 19 further comprising:

reading means for reading the image of an original document; and control means for sequentially subjecting the image of the original document read by said reading means to the processes to be performed by said recognition means, said translation means and said image producing means.

24. A method of controlling an image processing apparatus for outputting a document image received through a communication line, comprising:

a receiving step of receiving information including document image data and a language indicating code that indicates a language of the document image through the communication line;

an extracting step of extracting the received language indicating code;

a discrimination step of discriminating the language of a document image to be received on the basis of a result of the extraction performed in said extraction step;

a selecting step of selecting at least one dictionary from a plurality of dictionaries for character recognition on the basis of a result of the discrimination performed in said discrimination step;

a recognition step of recognizing characters in the received document image by using the dictionary for the character recognition selected in said selecting step;

a translation step of translating to a predetermined language on the basis of the recognition performed in said recognition step; and an image producing step of producing a document image on the basis of a result of the translation performed in said translation step.

25. A method of controlling an image processing apparatus according to claim 24 further comprising an appointing step for appointing a language to which the translation is performed in said translation step.

26. A method of controlling an image processing apparatus according to claim 24 further comprising an output step for forming the document image produced in said image producing step on a predetermined recording medium so as to output the document image.

27. A method of controlling an image processing apparatus according to claim 24 further comprising:

a step for transmitting information to and receiving information from a variety of processing apparatuses on a network;

a first storing step for storing the received document image into a predetermined storage means as a file;

a second storing step for storing, into said storage means, a character code group recognized in said recognition step as a text file;

a third storing step for storing, into said storage means, a character code group translated in said translation step as a text file; and a fourth storing step for storing, into said storage means, the document image produced in said image producing step as a file, wherein the files stored in said first to fourth storing steps are shared by the various processing apparatuses connected to said network.

28. A method of controlling an image processing apparatus according to claim 24 further comprising:

a reading step for reading the image of an original document; and a control step for sequentially subjecting the read image of the original document to the processes to be performed in said recognition step, said translation step and said image producing step.

29. An image processing apparatus for outputting a document image received through a communication line, comprising:

registering means for registering transmission-side specifying numbers, each in correspondence with a language;

discriminating means for discriminating information of transmission-side specifying number which is supplied and received during a negotiation at the time of a call receipt;

determination means for determining whether the transmission-side specifying number discriminated by said discrimination means has being registered by said registering means;

designation means for, if said determination means determines that the transmission-side specifying number has been registered, designating dictionaries for character recognition, based on the language corresponding to the registered transmission-side specifying number;

recognition means for recognizing characters in the received document image by using the dictionaries for the character recognition designated by said designation means;

translation means for translating to a predetermined language on the basis of a result of the recognition performed by said recognition means; and image producing means for producing a document image on the basis of a result of the translation performed by said translation means.

30. An image processing apparatus according to claim 29 further comprising appointing means for appointing a language to which the translation is performed by said translation means.

31. An image processing apparatus according to claim 29 further comprising output means for forming the document image produced by said image producing means on a predetermined recording medium so as to output the document image.

32. An image processing apparatus according to claim 29 further comprising:

network connection means for transmitting information to and receiving information from a network;

storage means for storing information therein;

first storing means for storing the received document image into said storage means as a file;

second storing means for storing, into said storage means, a character code group recognized by said recognition means as a text file;

third storing means for storing, into said storage means, a character code group translated by said translation means as a text file; and fourth storing means for storing, into said storage means, the document image produced by said image producing means as a file, wherein the files stored by said first to fourth storing means are shared by the various processing apparatuses connected to said network.

33. An image processing apparatus according to claim 29 further comprising:

reading means for reading the image of an original document; and control means for sequentially subjecting the image of the original document read by said reading means to the processes to be performed by said recognition means, said translation means and said image producing means.

34. A method for controlling an image processing apparatus for outputting a document received through a communication line, comprising the steps of:

a registering step for registering transmission-side specifying numbers, each in correspondence with a language;

a discriminating step for discriminating information of transmission-side specifying number which is supplied and received during a negotiation at the time of a call receipt;

a determination step for determining whether the transmission-side specifying number discriminated in said discrimination step has been registered in said registering step;

a designation step for, if said determination step determines that the transmission-side specifying number has been registered, designating dictionaries for character recognition, based on the language corresponding to the registered transmission-side specifying number;

a recognition step for recognizing characters in the received document image by using the dictionaries for the character recognition designated in said designation step;

a translation step for translating to a predetermined language on the basis of a result of the recognition performed in said recognition step; and a image producing step for producing a document image on the basis of a result of the translation performed in said translation step.

35. A method of controlling an image processing apparatus according to claim 34 further comprising an appointing step for appointing a language to which the translation is performed in said translation step.

36. A method of controlling an image processing apparatus according to claim 34 further comprising an output step for forming the document image produced in said image producing step on a predetermined recording medium so as to output the document image.

37. A method of controlling an image processing apparatus according to claim 34 further comprising:

a step for transmitting information to and receiving information from a variety of processing apparatuses on a network;

a first storing step for storing the received document image into a predetermined storage means as a file;

a second storing step for storing the received document image into said storage means as a file;

a second storing step for storing, into said storage means, a character code group recognized in said recognition step as a text file;

a third storing step for storing, into said storage means, a character code group translated in said translation step as a text file;

a fourth storing step for storing, into said storage means, the document image produced in said image producing step as a file, wherein the files stored in said first to fourth storing steps are shared by the various processing apparatuses connected to said network.

38. A method of controlling an image processing apparatus according to claim 34 further comprising:

a reading step for reading the image of an original document; and a control step for sequentially subjecting the image of the original document read in said reading step to the processes to be performed in said recognition step, said translation step and said image producing step.

39. An image processing apparatus for outputting a document image received through a communication line, comprising:

extraction means for extracting a partial image of a received document image positioned at a predetermined position in the document image and having a predetermined format;

appointing means for appointing dictionaries for character recognition on the basis of the extracted partial image;

recognition means for recognizing characters in the received document image by using the dictionaries for the character recognition appointed by said appointing means;

translation means for translating to a predetermined language on the basis of a result of the recognition performed by said recognition means; and image producing means for producing a document image on the basis of a result of the translation performed by said translation means.

40. An image processing apparatus according to claim 39, wherein the partial image extracted by said extraction means is a bar-code image.

41. An image processing apparatus according to claim 39, wherein the partial image extracted by said extraction means includes information as to the appointed language to which the translation is performed.

42. An image processing apparatus according to claim 39 further comprising second appointing means for appointing a language to which the translation is performed by said translation means.

43. An image processing apparatus according to claim 39 further comprising output means for forming the document image produced by said image producing means on a predetermined recording medium so as to output the document image.

44. An image processing apparatus according to claim 39 further comprising:

network connection means for transmitting and receiving information to and from a network;

storage means for storing information therein;

first storing means for storing the received document image into said storage means as a file;

second storing means for storing, into said storage means, a character code group recognized by said recognition means as a text file;

third storing means for storing, into said storage means, a character code group translated by said translation means as a text file; and fourth storing means for storing, into said storage means, the document image produced by said image producing means as a file, wherein the files stored by said first to fourth storing means are shared by the various processing apparatuses connected to said network.

45. An image processing apparatus according to claim 39 further comprising:

reading means for reading the image of an original document; and control means for sequentially subjecting the image of the original document read by said reading means to the processes to be performed by said recognition means, said translation means and said image producing means.

46. A method of controlling an image processing apparatus for outputting a document image received through a communication line comprising:

an extraction step for extracting a partial image of a received document image positioned at a predetermined position in the document image and having a predetermined format;

an appointing step for appointing dictionaries for character recognition on the basis of the extracted partial image;

a recognition step for recognizing characters in the received document image by using the dictionaries for the character recognition appointed in said appointing step;

a translation step for translating to a predetermined language on the basis of a result of the recognition performed in said recognition step; and an image producing step for producing a document image on the basis of a result of the translation performed in said translation step.

47. A method of controlling an image processing apparatus according to claim 46, wherein the partial image extracted in said extraction step is a bar-code image.

48. A method of controlling an image processing apparatus according to claim 46, wherein the partial image extracted in said extraction step includes information as to a language to which the translation is performed.

49. A method of controlling an image processing apparatus according to claim 46 further comprising a second appointing step for appointing a language to which the translation is performed in said translation step.

50. A method of controlling an image processing apparatus according to claim 46 further comprising an output step for forming the document image produced in said image producing step on a predetermined recording medium so as to output the document image.

51. A method of controlling an image processing apparatus according to claim 46 further comprising:

a step for transmitting and receiving information to and from a variety of processing apparatuses on a network;

a first storing step for storing the received document image into a predetermined storage means as a file;

a second storing step for storing, into said storage means, a character code group read in said recognition step as a text file;

a third storing step for storing, into said storage means, a character code group translated in said translation step as a text file; and a fourth storing step for storing, into said storage means, the document image produced in said image producing step as a file, wherein the files stored in said first to fourth storing steps are shared by the various processing apparatuses connected to said network.

52. A method of controlling an image processing apparatus according to claim 46 further comprising:

a reading step for reading the image of an original document; and a control step for sequentially subjecting the image of the original document read in said reading step to the processes to be performed in said recognition step, said translation step and said image producing step.

* * * * *

UNITED STATES PATENT AND TRADEMARK OFFICE
CERTIFICATE OF CORRECTION

PATENT NO. : 5,727,082

DATED : March 10, 1998

INVENTOR(S): KIYOHISA SUGISHIMA

It is certified that error appears in the above-identified patent and that said Letters Patent is hereby corrected as shown below:

COLUMN 1

Line 49, "able" should read --able to--.

COLUMN 4

Line 8, "of" should be deleted.

COLUMN 5

Line 34, "of" should read --of)--.

COLUMN 6

Line 34, "and" should read --one--.

COLUMN 8

Line 64, "the" (first occurrence) should be deleted.

COLUMN 11

Line 63, "made" should read --made to--.

COLUMN 12

Line 62, ";n" should read --in--.

UNITED STATES PATENT AND TRADEMARK OFFICE
CERTIFICATE OF CORRECTION

PATENT NO. : 5,727,082

DATED : March 10, 1998

INVENTOR(S): KIYOHISA SUGISHIMA

It is certified that error appears in the above-identified patent and that said Letters Patent is hereby corrected as shown below:

COLUMN 13

Line 20, "code:" should read --code;--.

COLUMN 15

Line 38, "indicating" should read --indicates--.

Signed and Sealed this

Twenty-second Day of December, 1998

Attest:

BRUCE LEHMAN

Attesting Officer

Commissioner of Patents and Trademarks